(12) United States Patent
Takashima et al.

(10) Patent No.: US 7,020,787 B2
(45) Date of Patent: Mar. 28, 2006

(54) MICROPROCESSOR

(75) Inventors: Satoshi Takashima, Ibaraki (JP);
Hideshi Nishida, Nishinomiya (JP);
Kozo Kimura, Toyonaka (JP); Tokuzo Kiyohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 498 days.

(21) Appl. No.: 10/323,419

(22) Filed: Dec. 18, 2002

(65) Prior Publication Data

US 2003/0135779 A1     Jul. 17, 2003

(30) Foreign Application Priority Data

Dec. 19, 2001   (JP) .............................. 2001-386710

(51) Int. Cl.
*G06F 1/32*   (2006.01)
(52) U.S. Cl. .................. 713/320; 713/300; 713/322; 713/323; 713/324
(58) Field of Classification Search ............... 713/300, 713/320, 322, 323, 324
See application file for complete search history.

(56) References Cited

U.S. PATENT DOCUMENTS

| | | | | |
|---|---|---|---|---|
| 5,418,969 A | * | 5/1995 | Matsuzaki et al. ........... | 713/322 |
| 5,790,877 A | * | 8/1998 | Nishiyama et al. .......... | 713/323 |
| 5,809,306 A | * | 9/1998 | Suzuki et al. ................ | 717/143 |
| 5,918,058 A | * | 6/1999 | Budd .......................... | 713/300 |
| 6,141,283 A | * | 10/2000 | Bogin et al. ................. | 365/226 |
| 6,205,534 B1 | * | 3/2001 | Kamiyama et al. ........... | 712/32 |
| 6,219,796 B1 | * | 4/2001 | Bartley ........................ | 713/320 |
| 6,519,707 B1 | * | 2/2003 | Clark et al. .................. | 713/322 |

* cited by examiner

*Primary Examiner*—Thomas C. Lee
*Assistant Examiner*—Vincent Tran

(57) ABSTRACT

A microprocessor comprises a calculation unit that (i) includes partial calculation units each operable to perform partial data calculation, and (ii) is operable to perform data calculation on N or less bits, where N is a total number of bits on which the partial calculation units are to perform data calculation. The microprocessor, when having the calculation unit perform data calculation according to an instruction fetched from a memory, controls the partial calculation units depending on a bit width mode selected in terms of a number of bits on which data calculation is to be performed, so as to either (i) have all the partial calculation units operate, or (ii) suspend operation of a predetermined number of the partial calculation units, and have the rest of the partial calculation units operate.

24 Claims, 9 Drawing Sheets

FIG.3

| CLOCK SIGNALS (CLK) | | BUS WIDTH MODE | CLOCK SIGNALS TO PARTIAL CALCULATION UNIT 132a(CLKA) | CLOCK SIGNALS TO PARTIAL CALCULATION UNIT 132b(CLKB) | CLOCK SIGNALS TO PARTIAL CALCULATION UNIT 132c(CLKC) |
|---|---|---|---|---|---|
| ON | | 16 BIT MODE | ON | ON | ON |
| | | 12 BIT MODE | ON | ON | OFF |
| | | 8 BIT MODE | ON | OFF | OFF |
| OFF | | — | OFF | OFF | OFF |

FIG.4

| BUS WIDTH MODE | A CARRY INPUT TO THE CALCULATOR 133b | A CARRY INPUT TO THE CALCULATOR 133c | SELECTION OF A CARRY TO BE OUTPUTTED |
|---|---|---|---|
| 16 BIT MODE | INPUTTED | INPUTTED | A CARRY BIT SIGNAL OUTPUTTED FROM THE CALCULATOR 133c(carry [2]) |
| 12 BIT MODE | INPUTTED | INHIBITED | A CARRY BIT SIGNAL OUTPUTTED FROM THE CALCULATOR 133b(carry [1]) |
| 8 BIT MODE | INHIBITED | INHIBITED | A CARRY BIT SIGNAL OUTPUTTED FROM THE CALCULATOR 133a(carry [0]) |

FIG.5

| BUS WIDTH MODE | OPERATION MODE | VOLTAGE TO BE IMPRESSED ON CALCULATION UNIT (V) | FREQUENCY OF CLOCK SUPPLIED TO CALCULATION UNIT (MHz) |
|---|---|---|---|
| 16 BIT MODE | — | 1.8 | 100 |
| 12 BIT MODE | NORMAL MODE | 1.8 | 100 |
| | HIGH-SPEED MODE | 1.8 | 133 |
| | LOW ELECTRIC POWER CONSUMPTION MODE | 1.6 | 100 |
| 8 BIT MODE | NORMAL MODE | 1.8 | 100 |
| | HIGH-SPEED MODE | 1.8 | 166 |
| | LOW ELECTRIC POWER CONSUMPTION MODE | 1.4 | 100 |

FIG.7

TYPES OF INSTRUCTIONS

| MOVE |
|------|
| ADD16 |
| ADD12 |
| ADD8 |
| CHANGE |
| : : |

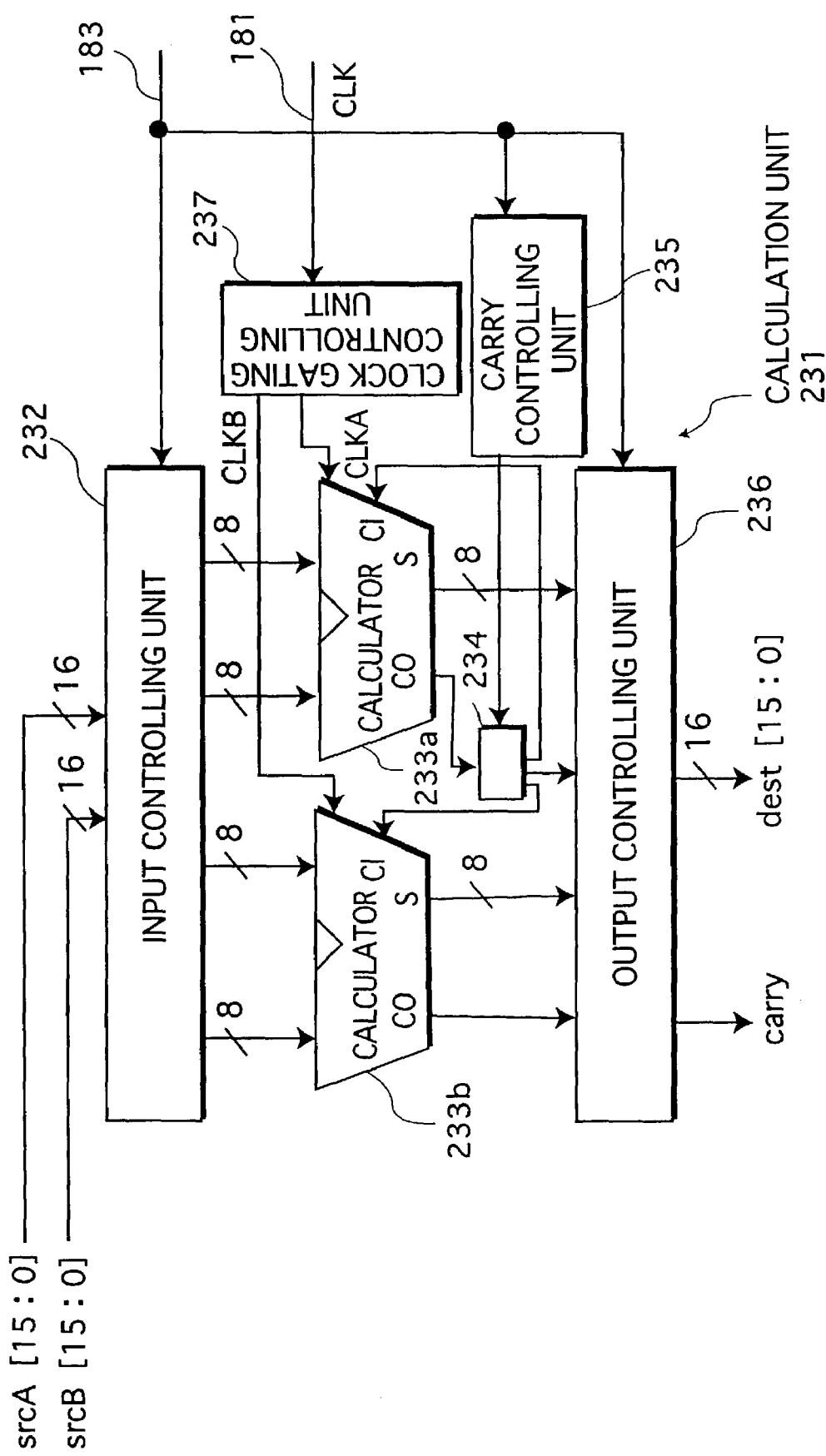

MICROPROCESSOR

BACKGROUND OF THE INVENTION (1) Field of the Invention

The present invention relates to microprocessors, particularly, a technique to reduce electric power consumption of microprocessors.

(2) Description of the Related Art

In the prior art, when an application program of a specific purpose is to be executed, it is known as a technique for reducing electric power consumption of a microprocessor to suspend an electric power supply (voltage impression) or a clock signal supply to one or more of independent functional blocks in the microprocessor that are not used in the execution of the application program.

For example, when a processor such as a VLIW (Very Long Instruction Word) microprocessor that includes a plurality of independent processing elements is installed in a product, and a specific application program is to be executed, it is possible to identify in advance, as a part of product designs, which processing elements will not be used in the execution of the specific application program, and to control and suspend the supply of clock signals to the unused processing elements. Through such control, it is possible to reduce electric power consumption of a microprocessor without degrading its processing performance. Further, a technique for controlling parallelism of a plurality of CPUs according to their system operation environment settings is disclosed in U.S. Pat. No. 5,913,068.

In recent years, many kinds of multi-functional information processing machines have been developed along with the multi-media-related technology being developed in the background.

Microprocessors installed in such multi-functional information processing machines are required to execute various kinds of application programs involving different types of data such as an application program focusing on control of graphical user interface or audio-visual digital signal processing, for example.

In general, each of such application programs includes calculation instructions specifying data calculation e.g. an addition, although types of data being treated are different from one application program to another. Generally speaking, all the calculation instructions in different application programs are processed in the same data calculation circuit in a microprocessor.

Accordingly, as for the data calculation circuit in a microprocessor, it is not possible to apply the technique of the prior art so as to control and suspend the supply of voltage impression and clock signals thereto, no matter which application program is to be executed.

SUMMARY OF THE INVENTION

In view of the above-mentioned problem, an object of the present invention is to provide a microprocessor with a mechanism that is capable of reducing electric power consumption in execution of data calculation, while maintaining the level of calculation performance required for different types of data that are treated in different application programs to be executed by the microprocessor.

Another object of the present invention is to provide a microprocessor that is capable of increasing the speed of data calculation when application programs to be executed treat a certain type of data that satisfies a condition. Since microprocessors are required to be all-purpose and to work on various kinds of data, such capability is beyond a basic performance level of microprocessors.

In order to solve the problems, the present invention is based on a notion that, generally speaking, different application programs have different ranges of data values to be processed, and have different effective numbers of bits required for data calculation. The present invention provides a microprocessor that performs processing according to an instruction fetched from a memory, comprising: a calculation circuit that (i) includes partial calculation circuits which each perform partial data calculation, and (ii) is operable to perform data calculation on N or less bits, where N is a total number of bits on which the partial calculation circuits are to perform data calculation; a bit width selecting unit operable to select a bit width mode that designates a certain number of bits on which data calculation is to be performed; an execution controlling unit operable to, if the fetched instruction is an instruction for data calculation, control the calculation circuit to perform data calculation; and an operation controlling unit operable to, when the execution controlling unit controls the calculation circuit to perform data calculation, (i) have all the partial calculation circuits operate, in a case where the bit width selecting unit selects a first bit width mode designating N bits, and (ii) suspend operation of a predetermined number of the partial calculation circuits, and have the rest of the partial circulation circuits operate, in a case where the bit width selecting unit selects a second bit width mode designating less than N bits.

With the stated arrangement, in the case where the second bit width mode is selected, it is possible to make electric power consumption less than in the case where the first bit width mode is selected, since only a certain number of partial calculation circuits operate. Thus, by selecting a bit width mode depending on the level of calculation performance required by each of the application programs, in other words, depending on an effective number of bits for data calculation required by each of the application programs, it is possible to reduce electric power consumption on account of unused partial calculation circuits, if any, because the operation controlling unit has only required partial calculation circuits operate among the partial calculation circuits included in a function block that performs calculation.

Further, the microprocessor may have an arrangement, wherein the partial calculation circuits each perform partial data calculation upon receiving a clock signal, and the operation controlling unit (i) in a case where the bit width selecting unit selects the first bit width mode, supplies a clock signal to each of all the partial calculation circuits, and (ii) in a case where the bit width selecting unit selects the second bit width mode, suspends the supply of a clock signal to a predetermined number of the partial calculation circuits, and supplies a clock signal to each of the rest of the partial calculation circuits.

With the stated arrangement, it is possible to suspend operation of a certain number of partial calculation circuits under a certain condition, by a relatively simple arrangement of controlling and suspending the supply of clock signals.

Further, the microprocessor may have an arrangement, wherein the partial calculation circuits each include a calculator and a bit data obtaining circuit, the calculator performing data calculation on a number of bits of data supplied, and the bit data obtaining circuit, upon receiving a clock signal, obtaining the number of bits of data from one or more data buses and supply to the calculator, the number being specific to each of the partial calculation circuits, and the operation controlling unit supplies a clock signal to each of the partial circulation circuits by supplying a clock signal to each of the bit data obtaining circuits.

With the stated arrangement, it is possible to perform control so as not to supply data to the calculators in vain by a relatively simple arrangement. As a result, the input values of a certain number of calculators are unchanged under a certain condition; therefore, it is possible to make electric power consumption of such calculators very little.

Further, the microprocessor may have an arrangement, wherein the partial calculation circuits, except for a partial calculation circuit that performs data calculation on a most significant bit of the N bits, are each operable to output a carry bit signal indicating an overflow occurring during data calculation, the calculation circuit includes a carry bit signal transmitting unit that inputs to each of all the partial calculation circuits except for a partial calculation circuit that performs data calculation on a least significant bit of the N bits, a carry bit signal outputted from a partial calculation circuit that performs data calculation on a number of less significant bits than the particular partial calculation circuit to which such a carry bit signal is to be inputted does, and the microprocessor further comprises a carry bit signal inhibiting unit operable to, in a case where the bit width selecting unit selects the second bit width mode, inhibit the carry bit signal transmitting unit from inputting a carry bit signal to the predetermined number of the partial calculation circuits to which the supply of a clock signal is suspended by the operation controlling unit.

With the stated arrangement, the microprocessor has capability of easily increasing the speed of processing and reducing the electric power consumption, because it is possible to partially inhibit the transmission of carry bit signals in the case where the second bit width mode is selected. Consequently, such capability is useful in realizing a microprocessor that is power-saving and has a high performance level. For instance, by providing another controlling unit operable to control the level of the voltage to be impressed on each of the calculators, it would be possible to lower a little the level of the voltage to be impressed on the entire calculation circuit without lowering the speed of the calculation, as long as the second bit width mode is selected. By providing another controlling unit operable to control the frequency of the clock signals to be supplied to each of the calculators, it would be possible to increase the speed of calculation a little, as long as the second bit width mode is selected.

The microprocessor may further comprise a clock frequency controlling unit operable to (i) control the operation controlling unit to supply the clock signal of a first frequency to each of the partial calculation circuits, in a case where the bit width selecting unit selects the first bit width mode, and (ii) control the operation controlling unit to supply the clock signal of a second frequency, which is higher than the first frequency, to each of the partial calculation circuits, in a case where the bit width selecting unit selects the second bit width mode.

With the stated arrangement, in the case where a certain number of partial calculation circuits are not required to operate, it is possible to increase the speed of data calculation beyond the standard performance level which is determined by how much time is required for transmitting carry bit signals and the like, when all the partial calculation circuits are required to operate.

The microprocessor may further comprise a voltage controlling unit operable to control a voltage level so as to (i) impress a voltage of a first voltage level on the calculation circuit in a case where the bit width selecting unit selects the first bit width mode, and (ii) impress a voltage of a second voltage level, which is lower than the first voltage level, on the calculation circuit in a case where the bit width selecting unit selects the second bit width mode.

With the stated arrangement, it is possible to reduce electric power consumption for data calculation because the level of the voltage to be impressed on the calculation circuit can be lowered in the case where a certain number of partial calculation circuits are not required to operate.

The microprocessor may further comprise a clock frequency controlling unit operable to (i) control the operation controlling unit to supply the clock signal of a first frequency to each of the partial calculation circuits, in a case where the bit width selecting unit selects the first bit width mode, and (ii) control the operation controlling unit to supply the clock signal of a second frequency, which is higher than the first frequency, to each of the partial calculation circuits, in a case where the bit width selecting unit selects the second bit width mode; a voltage controlling unit operable to control a voltage level so as to (i) impress a voltage of a first voltage level on the calculation circuit in a case where the bit width selecting unit selects the first bit width mode, and (ii) impress a voltage of a second voltage level, which is lower than the first voltage level, on the calculation circuit in a case where the bit width selecting unit selects the second bit width mode; a control mode selecting unit operable to select a control mode in terms of the frequency of the clock signal to be supplied to each of the partial calculation circuits, and the voltage level of the voltage to be impressed on the calculation circuit; and a switching unit operable to (i) in a case where the control mode selecting unit selects a first control mode, enable the clock frequency controlling unit to control, and disable the voltage controlling unit to control, and (ii) in a case where the control mode selecting unit selects a second control mode, enable the voltage controlling unit to control, and disable the frequency controlling unit to control.

With the stated arrangement, the microprocessor is able to choose either increasing the speed of data calculation or reducing the electric power consumption for data calculation, and, for example, is able to specify such a choice for each application program and the like.

The microprocessor may further comprise a signal stabilizing unit operable to maintain at a predetermined level, for a predetermined period of time, a voltage level of a signal line used for outputting a signal to outside of the microprocessor, the predetermined period starting from when the control mode selecting unit changes from one control mode to another control mode.

With the stated arrangement, it is possible to prevent bad influences that the changes in the voltages and frequencies in the microprocessor may have on other circuits connected to the microprocessor.

Further, the microprocessor may comprise a memory access unit operable to access an external memory, wherein if the fetched instruction is an instruction for data-writing into a memory, the execution controlling unit has the memory access unit write one or more pieces of data into the external memory, and the bit width selecting unit selects a bit width mode according to a value stored in a predetermined area of the external memory.

With the stated arrangement, each application program is able to easily inform the microprocessor of such information required for judging conditions of suspending operation of a certain number of partial calculation circuits, i.e. a value of a bit width, by setting a bit width mode in a predetermined memory area, the bit width mode determined based on an effective number of bits in data calculation. Thus, it is possible to perform fine-tuned control in order to reduce electric power consumption by individually judging, for each of the application programs, whether or not all the partial calculation circuits are required to operate.

Further, the microprocessor may have an arrangement, wherein if the fetched instruction is an instruction for data calculation, the bit width selecting unit selects (i) the first bit width mode, in a case where the fetched instruction is an instruction for data calculation on N bits, and (ii) the second bit width mode, in a case where the fetched instruction is an instruction for data calculation on less than N bits.

With the stated arrangement, the microprocessor is able to execute with less electric power consumption an application program that is constructed only with instructions for data calculation on 8-bit data, than in the case where an application program is constructed only with instructions for data calculation on 16-bit data. Thus, for example, when comparing (a) an application program or a program routine that processes moving image compression or decompression in low image quality and (b) an application program or a program routine that processes moving image decompression in high image quality, the number of bits required for calculation is different; therefore, it would be possible to reduce electric power consumption in execution of the former application program than in execution of the latter, by constructing each of the application programs with calculation instructions with the specific number of bits required.

Further, the microprocessor may comprise: a data storage unit including an area that stores therein a result of data calculation performed by the calculation circuit, the result being N bits; and a data writing controlling unit operable to (i) in a case where the first bit width mode is selected, have the entire N bits of the result written in the area and (ii) in a case where the second bit width mode is selected, have only a part of the result being less than N bits written in the area.

With the stated arrangement, it is possible to reduce electric power consumption by avoiding wasteful writing, more specifically, by only writing in an area of a storage unit such as a cache memory or a register etc. that is as small as the effective number of bits, according to the bit width mode based on an effective number of bits for data calculation required by each application program.

Further, the microprocessor may comprise a data writing controlling unit operable to (i) in a case where the first bit width mode is selected, have the entire N bits of a result outputted from the calculation circuit written in an external memory, and (ii) in a case where the second bit width mode is selected, have only a part of the result being less than N bits written in the external memory.

With the stated arrangement, it is possible to reduce electric power consumption by avoiding wasteful writing, more specifically, by only writing via buses as few as the effective number of bits of an external memory, according to the bit width mode based on an effective number of bits for data calculation required by each application program.

Further, the microprocessor may have an arrangement, wherein the calculation circuit includes two partial calculation circuits that each perform partial data calculation on N/2 bits, and the execution controlling unit, if the fetched instruction is an instruction for data calculation on N bits, and also in a case where the bit width selecting unit selects the second bit width mode, (i) have one of the partial calculation circuits perform partial data calculation on lower N/2 bits out of the N bits, before (ii) having the same partial calculation circuit perform partial data calculation on upper N/2 bits, while taking account of an overflow, if any, that has occurred during the partial data calculation on the lower N/2 bits.

With the stated arrangement, it is possible to reduce electric power consumption, in the case where a piece of 16-bit data needs to be calculated by a data calculation circuit that is capable of calculate 16-bit data, by having such a data calculation circuit perform data calculation on a piece of 8-bit data twice, although the speed of calculation may be slower.

Further, the microprocessor may have an arrangement, wherein the partial calculation circuits each perform partial data calculation upon receiving a number of bits of data supplied, and the operation controlling unit (i) supplies to each of all the partial calculation circuits as many number of bits of as possible for that particular partial calculation circuit, in a case where the bit width mode selecting unit selects the first bit width mode, and (ii) suspends the supply of bits of data to a predetermined number of the partial calculation circuits, and supplies to each of the rest of the partial calculation circuits, as many number of bits as possible for that particular partial calculation circuit, in a case where the bit width mode selecting unit selects the second bit width mode.

With the stated arrangement, it is possible to reduce electric power consumption in data calculation by controlling the supply of bits of data to a certain number of partial calculation circuits.

Further, the microprocessor may have an arrangement, wherein each of the partial calculation circuits performs data calculation while a predetermined level of a voltage is being impressed thereon, and the operation controlling unit (i) impresses the predetermined level of the voltage on each of all the partial calculation circuits, in a case where the bit width selecting unit selects the first bit width mode, and (ii) suspends the impression of the predetermined level of the voltage on a predetermined number of the partial calculation circuits, and impresses the predetermined level of the voltage on each of the rest of the partial calculation circuits, in a case where the bit width selecting unit selects the second bit width mode.

With the stated arrangement, it is possible to suspend operation of a certain number of partial calculation circuits under a certain condition by a relatively simple arrangement of controlling and suspending a voltage to be impressed.

BRIEF DESCRIPTION OF THE DRAWINGS

These and the other objects, advantages and features of the invention will be come apparent from the following description thereof taken in conjunction with the accompanying drawings which illustrate a specific embodiment of the invention.

In the drawings:

FIG. 3 is a truth table for inputs to and outputs from the clock gating controlling unit 136;

FIG. 4 is a control table to show control signals outputted by the carry controlling unit 137 based on inputted signals;

FIG. 5 is a control table to show the control by the voltage controlling unit 150 and the frequency controlling unit 160 according to different bus width modes and operation modes;

FIG. 7 shows an example of a part of an instruction set for the processor 300;

FIG. 9 shows a detailed structure of the calculation unit 231 in the fourth embodiment.

DESCRIPTION OF THE PREFERRED EMBODIMENT

1. First Embodiment

The following describes the processor 100 in the first embodiment of the present invention, with reference to FIGS. 1 through 5.

1-1. General Structure

Figure 1:
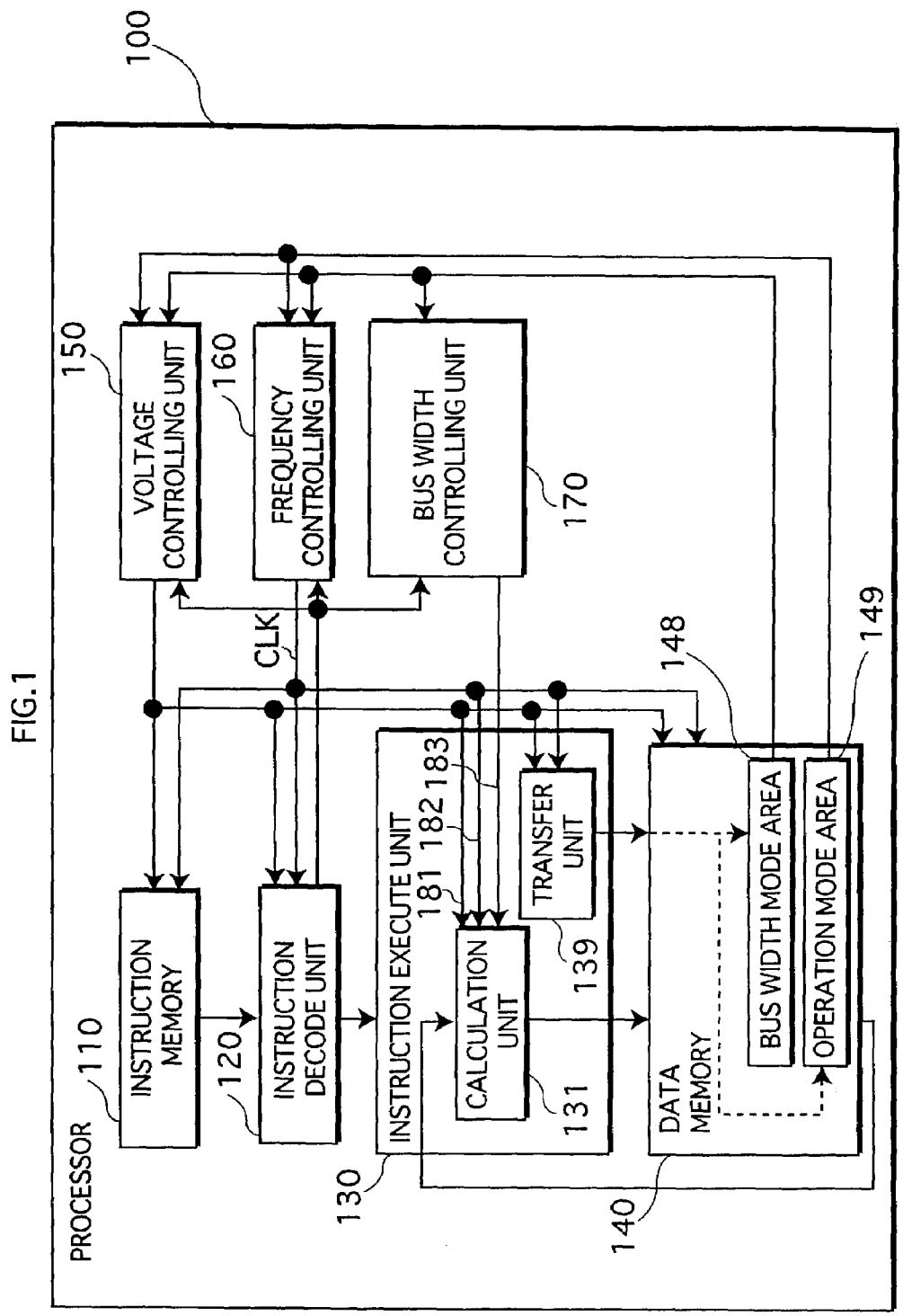
FIG. 1 is a functional block diagram of the processor 100 in the first embodiment of the present invention.

FIG. 1 is a functional block diagram of the processor 100 in the first embodiment of the present invention.

The processor 100 is a processor that decodes instructions in a program stored in an external memory and executes processing specified by those instructions. The processor 100 is constructed with a CMOS (Complementary Metal Oxide Semiconductor) and includes the instruction memory 110, the instruction decode unit 120, the instruction execute unit 130, the data memory 140, the voltage controlling unit 150, the frequency controlling unit 160, and the bus width controlling unit 170, as shown in the functional block diagram in FIG. 1.

It should be noted here that the instruction memory 110 is a cache memory for storing instructions to be executed that are fetched from an external memory. The external memory stores programs such as various kinds of application programs for specific purposes and an operating system to control the execution of those application programs. All the instructions necessary for the execution of those programs are fetched by the instruction memory 110.

The effective value of numerical data treated in application programs may vary from one application program to another, for example, it could be less than a hundred, less than two thousand, or less than thirty thousand. It means that some application programs treat only such data that can be expressed with 8 bits, and some with 12 bits, and some with 16 bits. In addition, some application programs need to be executed at high speed, and some applications do not need to be executed at high speed but the electric power consumption therefore should be reduced. It is understood that programmers and system designers are able to recognize in advance such characteristics of each application program, and it is assumed that application programs are structured so that a bus width mode and an operation mode (to be explained later) can be specified within each program.

The instruction decode unit 120 is a circuit that fetches an instruction from the instruction memory 110 and decodes it one by one, and transmits, according to the results of the decoding, a control signal to a specific circuit etc. in the instruction execute unit 130 so as to have the specific circuit operate. The instruction decode unit 120 also instructs the voltage controlling unit 150, the frequency controlling unit 160, and the bus width controlling unit 170 to change their controlling actions when a specific instruction has been decoded. An example of such specific instructions is a dedicated instruction indicating that the application program to be executed has been changed (hereafter referred to as a CHANGE instruction), which is to be specified within an application program.

More specifically, the instruction decode unit 120 transmits the above-mentioned control signal according to the results of the decoding of instructions; therefore, for example, in the case where the instruction decode unit 120 has decoded an add instruction, the instruction decode unit 120 transmits a control signal to control a switching element provided in the signal line for supplying clock signals so that the clock signals (CLK) from the frequency controlling unit 160 would be supplied to the clock gating controlling unit 136 in the calculation unit 131.

The instruction execute unit 130 is made up of various circuits such as the calculation unit 131, the transfer unit 139, and so on.

It should be noted here that the calculation unit 131 is a typical example of circuits that perform data calculation of 16-bit data, and it is assumed that the calculation unit 131 here is an adding circuit that adds up two pieces of 16-bit data that are inputted and outputs a piece of 16-bit data as a result.

The transfer unit 139 is a circuit that transfers the data in an external memory to the data memory 140 in the processor. In actuality, the instruction execute unit 130 includes various data calculation circuits such as arithmetic circuits including a multiplying circuit etc. and logic circuits, as well as a circuit for transferring some data in the data memory 140 to an external memory.

The data memory 140 is a cache memory and register that stores data, and includes the bus width mode area 148 for storing bus width modes, and the operation mode area 149 for storing operation modes. The data memory 140 is connected via buses with various circuits such as calculation unit 131 in the instruction execute unit 130.

The bus width modes are modes to specify the number of bits required for data calculation, either the 16-bit mode, the 12-bit mode, or the 8-bit mode. The operation modes are modes to specify control related to electric-power-saving and higher speeds, namely, the normal mode, the high-speed mode, or the low electric power consumption mode.

Each application program is arranged to include, before a CHANGE instruction mentioned above, a data transfer instruction for transferring such data in the external memory that indicates the bus width mode and the operation mode to either the bus width mode area 148 or operation mode area 149 in the data memory. If the instruction decode unit 120 decodes a data transfer instruction and has the transfer unit 139 execute the transfer, then as a result, the bus width mode area 148 stores a bus width mode specified by the application program and the operation mode area 149 stores a operation mode specified by the application program.

The voltage controlling unit 150 controls the voltages to be impressed on functional blocks in the processor. It sometimes performs controlling so that no voltage is impressed on an unused functional block, and sometimes so that a voltage level to be impressed on the calculation unit 131 would be changed according to the bus width mode and the operation mode, with a trigger of the instruction decode unit 120 instructing the voltage control unit 150 to change its controlling actions.

The frequency controlling unit 160 supplies clock signals to each functional block in the processor, and controls the frequencies of clock signals and the like. It sometimes performs controlling so that no clock signals are supplied to an unused functional block, and sometimes so that the frequency of clock signals to be supplied to the calculation unit 131 would be changed according to the bus width mode and the operation mode, with a trigger of the instruction decode unit 120 instructing the frequency controlling unit 160 to change its controlling actions.

The processor 100 includes a mechanism which performs controlling so that the voltage level of a certain terminal that connects the processor 100 with an external circuit should be maintained, for a predetermined time e.g. some ten milliseconds, at the same level as a low-level standard voltage of the substrate on which the processor 100 is installed, for instance, in the event that (i) the voltage controlling unit 150 performs controlling so that no voltage is impressed on an unused functional block and some voltage is impressed on functional blocks in use, or so that the voltage levels should be changed, and (ii) the frequency controlling unit 160 performs controlling so that the clock frequency should be changed. The voltage controlling unit 150 and the frequency controlling unit 160 each transmit to the controlling mechanism such a signal that indicates a control action of changing the state of voltage or frequency is to be performed. Thus, it is possible to prevent a malfunction of an external circuit caused by changes in the voltage level of a certain terminal such as a terminal for outputting a request signal to the external circuit.

Further, the bus width controlling unit 170 refers to the bus width mode area 148 with a trigger of the instruction decode unit 120 instructing the bus width controlling unit 170 to change its controlling actions, and, for example, performs controlling by expressing each of the bus width modes with an identifiable 2-bit signal and informing the calculation unit 131 of a selected bus width mode.

1-2. The Internal Structure of the Calculation Unit and the Clock Gating Control The following describes in detail the calculation unit 131 which is an important element of the present invention.

Figure 2:
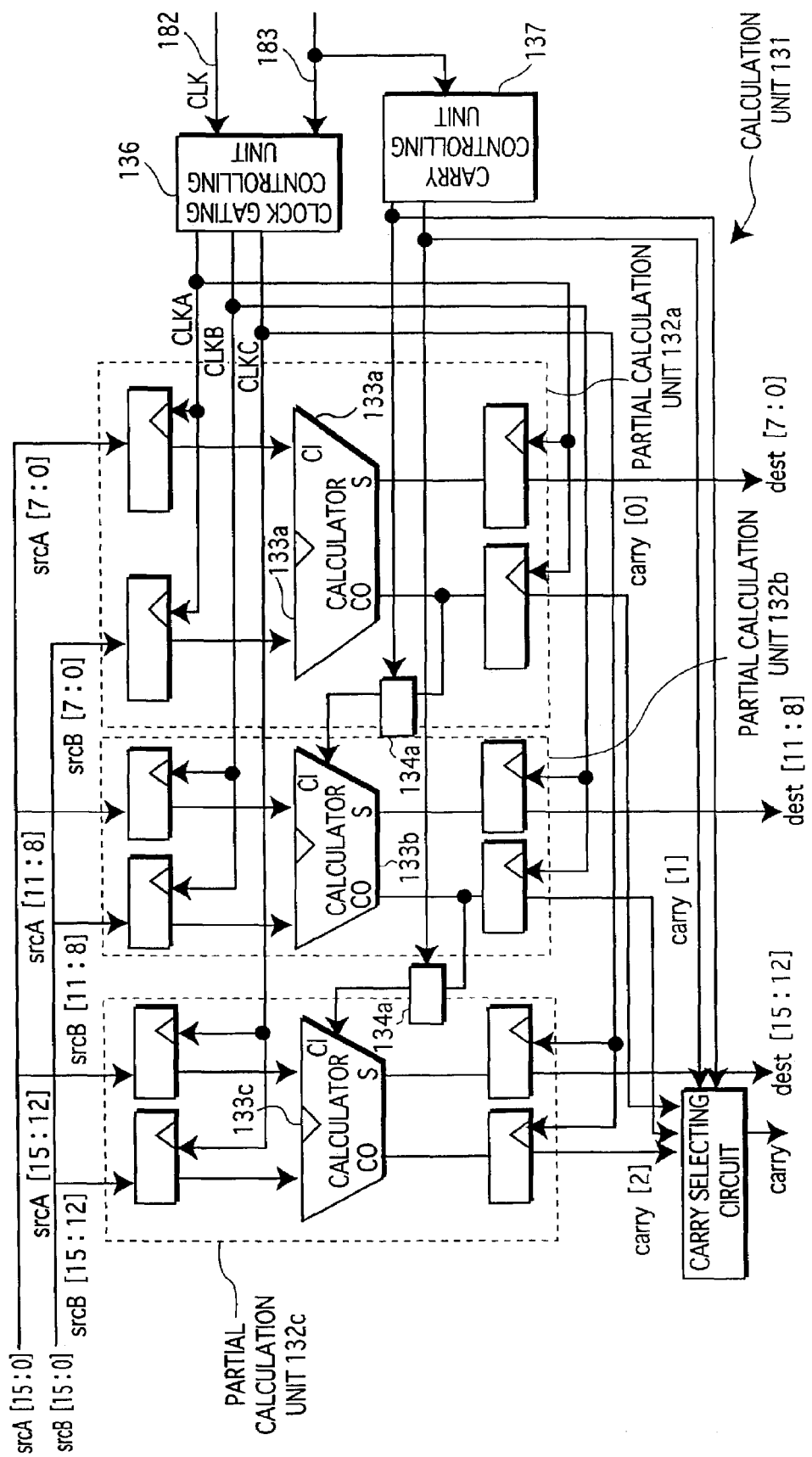
FIG. 2 shows a detailed structure of the calculation unit 131 of the first embodiment.

FIG. 2 shows a detailed structure of the calculation unit 131 of the first embodiment.

As shown in FIG. 2, the calculation unit 131 is a circuit that performs calculation on two pieces of 16-bit data that are indicated as "srcA" and "srcB" in the drawing, and outputs carry bit signals (carry) to indicate whether a carry has occurred or not, as well as pieces of 16-bit data indicated as "dest" in the drawing, as results of the calculation. The calculation unit 131 includes the partial calculation units 132a, 132b, and 132c, the carry transmitting units 134a and 134b, the carry selecting circuit 135, the clock gating controlling unit 136 and the carry controlling unit 137.

The partial calculation unit 132a performs calculation on a piece of 8-bit data starting with the least significant bit of the 16-bit data inputted for calculation, and outputs a piece of 8-bit data and a carry bit signal as results of the calculation. The partial calculation unit 132a includes (i) a section that reads a piece of 8-bit data to be calculated upon a clock signal being supplied, (ii) a calculator 133a that adds up two pieces of 8-bit data upon the reading, and (iii) a section that outputs a piece of 8-bit data and a carry bit signal as results of the calculation upon a clock signal being supplied.

The partial calculation unit 132b performs calculation on a piece of 4-bit data starting with the $8^{th}$ bit of the 16-bit data inputted for calculation (with the least significant bit counted as a $0^{th}$ bit), and outputs a piece of 4-bit data and a carry bit signal as results of the calculation. The partial calculation unit 132b includes (i) a section that reads a piece of 4-bit data to be calculated upon a clock signal being supplied, (ii) a calculator 133b that adds up two pieces of 4-bit data upon the reading, and (iii) a section that outputs a piece of 4-bit data and a carry bit signal as results of the calculation upon a clock signal being supplied.

The partial calculation unit 132c performs calculation on a piece of 4-bit data ending with the most significant bit of the 16-bit data inputted for calculation, and outputs a piece of 4-bit data and a carry bit signal as results of the calculation. The partial calculation unit 132c includes (i) a section that reads a piece of 4-bit data to be calculated upon a clock signal being supplied, (ii) a calculator 133c that adds up two pieces of 4-bit data upon the reading, and (iii) a section that outputs a piece of 4-bit data and a carry bit signal as results of the calculation upon a clock signal being supplied.

Under the control of the instruction decode unit 120, two pieces of 16-bit data are selected that are specified by certain addresses or register IDs in the data memory 140, according to an operand for an addition instruction and the like. The two pieces of 16-bit data selected will be placed on each of 16-bit buses and inputted to the calculation unit 131 as srcA [15:0] and srcB [15:0] respectively. Meanwhile, under the control of the instruction decode unit 120, in like manner, apiece of 16-bit data, namely dest [15:0] outputted by the calculation unit 131 will be stored in an area specified by a certain address or a register ID in the data memory 140 according to an operand for an addition instruction and the like. A carry bit signal (carry) outputted by the calculation unit 131 will be stored in what is called a flag register or the like.

The carry transmitting unit 134a is a circuit that inputs, under the control of the carry controlling unit 137, a carry bit signal outputted by the calculator 133a to what is called a carry-in terminal of the calculator 133b. The carry transmitting unit 134b is a circuit that inputs, under the control of the carry controlling unit 137, a carry bit signal outputted by the calculator 133b to what is called a carry-in terminal of the calculator 133c.

The carry selecting circuit 135 is a circuit that, under the control of the carry controlling unit 137, selects one of the carry bit signals outputted by the partial calculation units 132a, 132b, and 132c, and outputs the selected carry bit signal as an output signal from the calculation unit 131.

The clock gating controlling unit 136 receives a signal 183 indicating a bus width mode from the bus width controlling unit 170, and performs controlling by switching individually, for each of the partial calculation units, whether the clock signal 182 supplied by the frequency controlling unit 160 should be transmitted to each of partial calculation units or should be cut off, depending on the bus width mode indicated.

FIG. 3 is a truth table for inputs to and outputs from the clock gating controlling unit 136.

A clock signal (CLK) and a bus width mode shown in FIG. 3 are inputted signals; whereas an output signal from the clock gating controlling unit 136 to each of the partial calculation units is determined by a combination of a clock signal (CLK) and a value for a bus width mode.

More specifically, as shown in FIG. 3, upon a clock signal (CLK) being supplied by the frequency controlling unit 160, the clock gating controlling unit 136 transmits a clock signal to (i) all of the partial calculation units 132a, 132b, and 132c in the case where the bus width mode is the 16-bit mode, (ii) only two of the partial calculation units except for the partial calculation unit 132c in the case where the bus width mode is the 12-bit mode, and (iii) only the partial calculation unit 132a in the case where the bus width mode is the 8-bit mode.

The carry controlling unit 137 is a circuit that receives a signal 183 indicating a bus width mode from the bus width controlling unit 170, and controls the carry transmitting units 134*a*, 134*b* and the carry selecting circuit 135, depending on the bus width mode indicated.

FIG. 4 is a control table to show control signals outputted by the carry controlling unit 137 based on inputted signals.

In the table of FIG. 4, the bus width modes are inputted signals; The "carry input to the calculator 133*b*" is, for example, a 1-bit control signal instructing the carry transmitting unit 134*a* whether or not the inputted signal should be reflected on the output signal; The "carry input to the calculator 133*c*" is, for example, a 1-bit control signal instructing the carry transmitting unit 134*b* whether or not the inputted signal should be reflected on the output signal; "Selection of a carry to be outputted" denotes, for example, a 2-bit control signal instructing the carry selecting circuit 135 which calculator should be a source of a carry bit signal that is selected as an output signal from the calculation unit 131.

As shown in the table, in the case where the bus width mode is the 16-bit mode, the clock gating controlling unit 136 (i) instructs each of the carry transmitting units 134*a* and 134*b* to set the output value as the one to reflect the inputted carry bit signal, and also (ii) instructs the carry selecting circuit 135 to select the carry bit signal (carry [2]) inputted by the calculator 133*c*.

In the case where the bus width mode is the 12-bit mode, the clock gating controlling unit 136 (i) instructs the carry transmitting unit 134*a* to set the output value as the one to reflect the inputted carry bit signal, (ii) instructs the carry transmitting unit 134*b* not to change the output value, and also (iii) instructs the carry selecting circuit 135 to select the carry bit signal (carry [1]) inputted by the calculator 133*b*.

In the case where the bus width mode is the 8-bit mode, the clock gating controlling unit 136 (i) instructs both of the carry transmitting units 134*a* and 134*b* not to change the output values, and also (ii) instructs the carry selecting circuit 135 to select the carry bit signal (carry [0]) inputted by the calculator 133*c*.

1-3. Voltage Control and Frequency Control

The following explains the control by the voltage controlling unit 150 over the voltage impressed on the calculation unit 131, and the control by the frequency controlling unit 160 over the frequency of the clock signals supplied to the calculation unit 131.

FIG. 5 is a control table to show the control by the voltage controlling unit 150 and the frequency controlling unit 160 according to different bus width modes and operation modes.

As shown in the table, according to a combination of a bus width mode and an operation mode at the time of receiving from the instruction decode unit 120 instructions for changing their controlling actions, the voltage controlling unit 150 determines the voltage level to be impressed on the calculation unit 131, and the frequency controlling unit 160 determines the frequency of the clock signals to be supplied to the calculation unit 131.

In other words, if the bus width mode is the 16-bit mode, or if the operation mode is the normal mode, then the voltage controlling unit 150 impresses a voltage of 1.8 V (volts) on the calculation unit 131, and the frequency controlling unit 160 supplies clock signals of 100 MHz (megahertz) to the calculation unit 131. If the 12-bit mode is combined with the high-speed mode, then the voltage controlling unit 150 impresses a voltage of 1.8 V on the calculation unit 131, and the frequency controlling unit 160 supplies clock signals of 133 MHz to the calculation unit 131. If the 12-bit mode is combined with the low electric power consumption mode, then the voltage controlling unit 150 impresses a voltage of 1.6 V on the calculation unit 131, and the frequency controlling unit 160 supplies clock signals of 100 MHz to the calculation unit 131. If the 8-bit mode is combined with the high-speed mode, then the voltage controlling unit 150 impresses a voltage of 1.8 V on the calculation unit 131, and the frequency controlling unit 160 supplies clock signals of 166 MHz to the calculation unit 131. If the 8-bit mode is combined with the low electric power consumption mode, then the voltage controlling unit 150 impresses a voltage of 1.4 V on the calculation unit 131, and the frequency controlling unit 160 supplies clock signals of 100 MHz to the calculation unit 131.

It should be noted that calculation at the calculation unit 131 requires transmission of carries, and since the calculation of the upper column should reflect the result of the calculation of the lower column, the transmission of carries has a very large influence over the speed of the overall calculation.

Consequently, when the bus width mode is the 12-bit mode, it is possible to shorten the time required for calculation at the calculation unit 131 as a whole, because there are fewer stages of carry transmission than in the case where the 16-bit mode is selected; it is therefore possible to set the clock frequency higher and have the calculation performed at a higher speed than in the case where the 16-bit mode is selected. Further, in the case where the bus width mode is the 8-bit mode, it is possible to set the clock frequency even higher because there are fewer stages of carry transmission.

In other words, as shown in FIG. 5, by setting the frequency as, for example, 100 MHz for the 16-bit mode, 133 MHz for the 12-bit mode, and 166 MHz for the 8-bit mode, it is possible to make the clock frequency as high as the bus width mode allows, when an application program requires the high-speed mode.

In addition, when the bus width mode is the 12-bit mode, it is possible to shorten the time required for calculation at the calculation unit 131 as a whole, because there are fewer stages of carry transmission than when the bus width mode is the 16-bit mode; it is therefore possible to lower the voltage level and have the calculation performed at a lower speed than in the case where the 16-bit mode is selected, so as to, as a result, maintain the same level of performance as in the 16-bit mode at the calculation unit 131 as a whole. Further, when the bus width mode is the 8-bit mode, it is possible to keep the speed of calculation at the calculation unit 131 as a whole the same as in the case where the 16-bit mode is selected, and yet lower the voltage level further down because there are even fewer stages of carry transmission.

In other words, as shown in FIG. 5, by setting the voltage level as, for example, 1.8 V for the 16-bit mode, 1.6 V for the 12-bit mode, and 1.4 V for the 8-bit mode, it is possible to make the level of the voltage impressed on the calculation unit 131 as low as the bus width mode allows, when an application program requires the low electric power consumption mode. As additional information, the speed of calculation by the calculators is high when the voltage level is high, and conversely, the speed is low when the voltage level is low.

1-4. Operation in Detail

The following explains the operation of the processor 100 with reference to specific examples.

The operation of the processor 100 will be explained with an example in which, firstly, Application Program A involving 16-bit data needs to be executed, and secondly, Application Program B involving 8-bit data that requires execution in high speed will be executed, and thirdly, Application Program C involving 12-bit data that requires execution with lower electric power consumption will be executed.

Application Program A includes, to be executed initially, (i) a transfer instruction to set a value indicating the 16-bit mode in the bus width mode area 148, (ii) a transfer instruction to set a value indicating the normal mode in the operation mode area 149, and (iii) a CHANGE instruction to indicate a change of the application program. Application Program B includes, to be executed initially, (i) a transfer instruction to set a value indicating the 8-bit mode in the bus width mode area 148, (ii) a transfer instruction to set a value indicating the high-speed mode in the operation mode area 149, and (iii) a CHANGE instruction to indicate a change of the application program. Application Program C includes, to be executed initially, (i) a transfer instruction to set a value indicating the 12-bit mode in the bus width mode area 148, (ii) a transfer instruction to set a value indicating the low electric power consumption mode in the operation mode area 149, and (iii) a CHANGE instruction to indicate a change of the application program.

1-4-1. Operation in the 16-bit Mode Combined with the Normal Mode

First, the instruction memory 110 fetches a sequence of instructions from Application Program A, and both the instruction decode unit 120 and the instruction execute unit 130 execute each of the instructions sequentially, before a value indicating the 16-bit mode is set in the bus width mode area 148, and a value indicating the normal mode is set in the operation mode area 149 by execution of transfer instructions.

Next, after the instruction decode unit 120 decodes the CHANGE instruction in Application Program A, the instruction decode unit 120 instructs the voltage controlling unit 150, the frequency controlling unit 160, and the bus width controlling unit 170 to change their controlling actions, and as a result, the voltage controlling unit 150 impresses a voltage of 1.8 V on the calculation unit 131, the frequency controlling unit 160 inputs clock signals of 100 MHz to the clock gating controlling unit 136 in the calculation unit 131 (see FIG. 5), whereas the bus width controlling unit 170 refers to the value indicating a bus width mode in the bus width mode area 148, and transmits a signal that indicates the bus width mode to both the clock gating controlling unit 136 and the carry controlling unit 137 in the calculation unit 131. It should noted here that it takes longer to complete execution of the CHANGE instruction than to complete execution of a general instruction because the voltage etc. need to be stabilized immediately after the change of the voltage and so on.

Subsequently, in Application Program A, for example, the instruction decode unit 120 decodes an add instruction for adding up two pieces of 16-bit data in the data memory 140, and the instruction decode unit 120 instructs the calculation unit 131 to execute the instruction, then both the bit data reading sections and the calculation-result outputting sections of all the partial calculation units 132*a*, 132*b*, and 132*c* operate according to the clock signals (CLKA, CLKB, and CLKC) supplied by the clock gating controlling unit 136 (see FIG. 3), before all the bit values in both of the two pieces of 16-bit data i.e. srcA and srcB are respectively inputted to and calculated at one of the calculators 133*a*, 133*b*, and 133*c*, as well as the carry transmitting units 134*a* and 134*b* transmit carry bit signals (see FIG. 4). As a result, the calculation unit 131 outputs to the data memory 140 (i) a carry bit signal from the calculator 133*c*, and (ii) a piece of 16-bit data whose 4 most significant bits are a piece of 4-bit data which is a calculation result from the calculator 133*c*; whose following 4 bits are a piece of 4-bit data which is a calculation result from the calculator 133*b*; and whose least significant 8 bits are a piece of 8-bit data which is a calculation result from the calculator 133*a*. Thus, calculation has been completed so that all 16 bits out of the output data are effective.

Other add instructions in Application Program A will also be processed in the same way thereafter.

1-4-2. Operation in the 8-bit Mode Combined with the High-speed Mode

The following explanation is about the processor 100 executing Application Program B after completing the execution of instructions in Application Program A.

Here, since Application Program B performs data calculation on, and has calculation results of, such numeric values that can be expressed sufficiently with 8 bits e.g. 1 to 100, it is assumed that the 8-bit mode is selected.

The instruction memory 110 fetches a sequence of instructions from Application Program B, and both the instruction decode unit 120 and the instruction execute unit 130 execute each of the instructions sequentially, before a value indicating the 8-bit mode is set in the bus width mode area 148, and a value indicating the high-speed mode is set in the operation mode area 149 by execution of transfer instructions.

Next, after the instruction decode unit 120 decodes the CHANGE instruction in Application Program B, the instruction decode unit 120 instructs the voltage controlling unit 150, the frequency controlling unit 160, and the bus width controlling unit 170 to change their controlling actions, and as a result, the voltage controlling unit 150 impresses a voltage of 1.8 V on the calculation unit 131, the frequency controlling unit 160 inputs clock signals of 166 MHz to the clock gating controlling unit 136 in the calculation unit 131 (see FIG. 5), whereas the bus width controlling unit 170 refers to the value indicating a bus width mode in the bus width mode area 148, and transmits a signal that indicates the bus width mode to both the clock gating controlling unit 136 and the carry controlling unit 137 in the calculation unit 131.

Subsequently, in Application Program B, for example, the instruction decode unit 120 decodes an add instruction for adding up two pieces of 16-bit data in the data memory 140, and the instruction decode unit 120 instructs the calculation unit 131 to execute the instruction, then both the bit data reading section and the calculation-result outputting section of only the partial calculation unit 132*a* operate according to the clock signal (CLKA) supplied by the clock gating controlling unit 136 (see FIG. 3), before the 8 least significant bits in both of the two pieces of 16-bit data i.e. srcA and srcB are inputted to and calculated at the calculator 133*a*, but the carry transmitting units 134*a* and 134*b* do not transmit a carry bit signal (see FIG. 4). As a result, electric power consumption is reduced since the calculators 133*b* and 133*c* do not perform calculation because there is no change in input values. Eventually the calculation unit 131 outputs to the data memory 140 (i) a carry bit signal from the calculator 133*a*, and (ii) a piece of 16-bit data whose 8 least significant bits are a piece of 8-bit data which is a calculation result from the calculator 133*a*. It should be noted here that the calculation-result outputting sections of the partial calculation units 132*b* and 132*c* are arranged with a wiring connection so that the output voltage level becomes zero if no clock signals are supplied. Consequently, the 8 most significant bits of the 16-bit data outputted by the calculation unit 131 show zero. Thus, calculation has been completed so that 8 bits out of the output data are effective.

Other add instructions in Application Program B get processed at higher speed than the add instructions in Application Program A. This way, Application Program B operates normally.

It should be noted that reduction of electric power consumption is achieved because the calculators 133b and 133c which have no change in input values upon execution of the add instruction are constructed with a CMOS, and therefore, consume very little electric power if no switching is performed.

Additionally, the electric power consumption of a CMOS circuit is proportional to the operating frequency and is proportional to the squares of the operating voltage. It means that, when the 8-bit mode is combined with the high-speed mode where the operation voltage is the same and the frequency of the clock signals supplied to the calculation circuits is higher than in the case where the 16-bit mode is selected, the electric power consumption can be lower compared to when the voltage is increased, as a way of achieving the goal of high-speed execution.

1-4-3. Operation in the 12-bit Mode Combined with the Low Electric Power Consumption Mode The following explanation is about the processor 100 executing Application Program C after completing the execution of instructions in Application Program B.

The instruction memory 110 fetches a sequence of instructions from Application Program C, and both the instruction decode unit 120 and the instruction execute unit 130 execute each of the instructions sequentially, before a value indicating the 12-bit mode is set in the bus width mode area 148 and a value indicating the low electric power consumption mode is set in the operation mode area 149 by execution of transfer instructions.

Next, after the instruction decode unit 120 decodes the CHANGE instruction in Application Program C, the instruction decode unit 120 instructs the voltage controlling unit 150, the frequency controlling unit 160, and the bus width controlling unit 170 to change their controlling actions, and as a result, the voltage controlling unit 150 impresses a voltage of 1.6 V on the calculation unit 131, the frequency controlling unit 160 inputs clock signals of 100 MHz to the clock gating controlling unit 136 in the calculation unit 131 (see FIG. 5), whereas the bus width controlling unit 170 refers to the value indicating a bus width mode in the bus width mode area 148, and transmits a signal that indicates the bus width mode to both the clock gating controlling unit 136 and the carry controlling unit 137 in the calculation unit 131.

Subsequently, in Application Program C, for example, the instruction decode unit 120 decodes an add instruction for adding up two pieces of 16-bit data in the data memory 140, and the instruction decode unit 120 instructs the calculation unit 131 to execute the instruction, then both the bit data reading section and the calculation-result outputting section of both the partial calculation units 132a and 132b operate according to the clock signals (CLKA and CLKB) supplied by the clock gating controlling unit 136 to the partial calculation units except for the partial calculation unit 132c (see FIG. 3), before (i) the 4 upper bits of the 12 least significant bits in both of the two pieces of 16-bit data i.e. srcA and srcB get inputted to and calculated at the calculator 133b, (ii) the 8 lower bits of the 12 least significant bits get inputted to and calculated at the calculator 133a, and (iii) the carry transmitting unit 134a transmits a carry bit signal, but the carry transmitting unit 134b does not (see FIG. 4). As a result, electric power consumption is reduced since the calculator 133c does not perform calculation because there is no change in input values. Eventually, the calculation unit 131 outputs to the data memory 140 (i) a carry bit signal from the calculator 133b, and (ii) a piece of 16-bit data whose least significant 8 bits are a piece of 8-bit data which is a calculation result from the calculator 133a; and whose following 4 bits are a piece of 4-bit data which is a calculation result from the calculator 133b. It should be noted here that the calculation-result outputting section of the partial calculation unit 132c is arranged with a wiring connection so that the output voltage level becomes zero if no clock signals are supplied. Consequently, the 4 most significant bits of the 16-bit data outputted by the calculation unit 131 show zero. Thus, calculation has been performed so that 12 bits out of the output data are effective.

Other add instructions in Application Program C get processed with lower electric power consumption than the add instructions in Application Program A.

2. Second Embodiment

Figure 6:
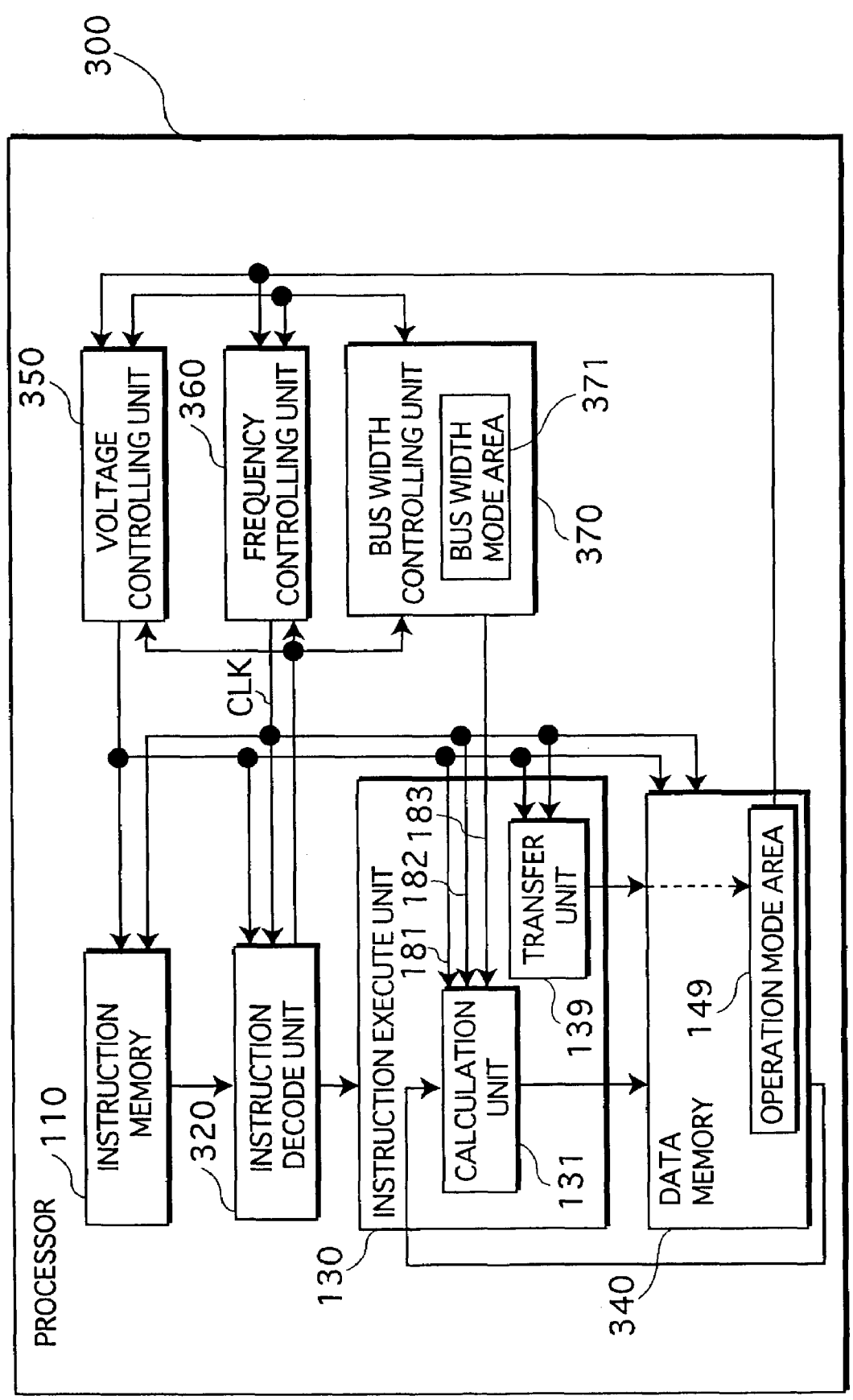
FIG. 6 is a functional block diagram of the processor 300 in the second embodiment of the present invention.

The following explains the processor 300 in the second embodiment, in which part of the processor 100 in the first embodiment is modified, with reference to FIGS. 6 and 7.

The processor 300 is different from the processor 100 in that the processor 300 changes the bus width mode individually for each instruction to be executed, depending on the number of bits in the data to be calculated under calculation instructions such as an add instruction in an application program, whereas the processor 100 was basically on an assumption that it changes the bus width mode for each application program to be executed.

FIG. 6 is a functional block diagram of the processor 300 in the second embodiment of the present invention. It should be noted that some of the components of the processor 300 which are virtually the same as the components of the processor 100 are indicated in FIG. 6 with same characters as in the FIG. 1, and detailed explanation of those same components will be omitted.

The processor 300 is constructed with a CMOS and includes the instruction memory 110, the instruction decode unit 320, the instruction execute unit 130, the data memory 340, the voltage controlling unit 350, the frequency controlling unit 360, and the bus width controlling unit 370, as shown in the functional block diagram in FIG. 6.

It should be noted here that the instruction decode unit 320 is a circuit that fetches an instruction from the instruction memory 110 and decodes them one by one, and transmits, according to the results of the decoding, a control signal to a specific circuit etc. in the instruction execute unit 130 so as to have such a specific circuit operate. The instruction decode unit 320 also instructs both the voltage controlling unit 350 and the frequency controlling unit 360 to change their controlling actions when a CHANGE instruction has been decoded. When a calculation instruction has been decoded, the instruction decode unit 320 detects the number of bits in the data to be calculated under the calculation instruction, and informs the bus width controlling unit 370 of the result of the detection.

FIG. 7 shows an example of a part of an instruction set for the processor 300.

In the table, the MOVE instruction is an instruction that instructs a data transfer; the ADD16 instruction is a 16-bit add instruction that instructs an addition of two pieces of 16-bit data and, as a result, an output of a piece of 16-bit data; the ADD12 instruction is a 12-bit add instruction that instructs an addition of two pieces of 12-bit data and, as a result, an output of a piece of 12-bit data; the ADD8 instruction is an 8-bit add instruction that instructs an addition of two pieces of 8-bit data and, as a result, an output of a piece of 8-bit data.

Thus, in the instruction set of the processor 300, it is possible to distinguish one instruction from another as either an instruction that instructs data calculation on 8-bit data, or an instruction that instructs data calculation on 12-bit data, or an instruction that instructs data calculation on 16-bit data.

These 16-bit add instruction, 12-bit add instruction, and 8-bit add instruction can be selectively used as required, for each application program individually, or for each processing in an application program individually. Note that it is preferable to arrange so that the application program sets the operation mode as the normal mode, if two or more different kinds of those 16-bit, 12-bit and 8-bit add instructions exist together in a sequence of instructions to be executed in a relatively short time within the application program. The reason is because it takes a certain period of time to change the voltage or the clock frequency; and therefore, the performance level of execution of the application program gets degraded if there are such changes frequently. For example, it takes approximately 10 μs of time to change the voltage by 1 mV.

Upon decoding a 16-bit add instruction, the instruction decode unit 320 informs the bus width controlling unit 370 that the mode is the 16-bit mode, and has the calculation unit 131 in the instruction execute unit 130 perform an addition; Upon decoding a 12-bit add instruction, the instruction decode unit 320 informs the bus width controlling unit 370 that the mode is the 12-bit mode, and has the calculation unit 131 perform an addition; Upon decoding an 8-bit add instruction, the instruction decode unit 320 informs the bus width controlling unit 370 that the mode is the 8-bit mode, and has the calculation unit 131 perform an addition.

The data memory 340 is a cache memory and register that stores data, and includes the operation mode area 149 for storing operation modes. Each application program is arranged to include, before a CHANGE instruction mentioned above, a data transfer instruction for transferring such data in an external memory that indicates the operation mode to the operation mode area 149 in the data memory. When the instruction decode unit 320 decodes a data transfer instruction and has the transfer unit 139 execute the transfer, then as a result, the operation mode area 149 stores an operation mode specified by the application program.

The bus width controlling unit 370 includes the bus width mode area 371 that stores and retains bus width modes. Upon obtaining a result of a detection by the instruction decode unit 320 of the number of bits in data to be calculated under an instruction, the bus width controlling unit 370 stores and retains the detection result in the bus width mode area 371. Consequently, the bus width mode area 371 retains information that indicates either (i) the 16-bit mode corresponding to an instruction for calculation of 16-bit data, (ii) the 12-bit mode corresponding to an instruction for calculation of 12-bit data, or (iii) the 8-bit mode corresponding to an instruction for calculation of 8-bit data. The bus width controlling unit 370 refers to the bus width mode area 371, and for example, performs controlling by expressing each of the bus width modes with a 2-bit signal so that they are identifiable and informing the calculation unit 131 of a selected bus width mode.

The voltage controlling unit 350 controls the voltages to be impressed on functional blocks in the processor. It sometimes performs controlling so that no voltage is impressed on an unused functional block, and sometimes so that a voltage level to be impressed on the calculation unit 131 would be changed according to a bus width mode selected well as the operation mode stored in the operation mode area 149, with a trigger of the instruction decode unit 320 instructing the voltage control unit 350 to change its controlling actions, or with a trigger of the change of the bus width mode in the bus width mode area 371.

The frequency controlling unit 360 supplies clock signals to each functional block in the processor, and controls the frequencies of clock signals and the like. It sometimes performs controlling so that no clock signals are supplied to an unused functional block, and sometimes so that the frequency of clock signals to be supplied to the calculation unit 131 would be changed according to a bus width mode selected as well as the operation mode stored in the operation mode area 149, with a trigger of the instruction decode unit 320 instructing the frequency controlling unit 360 to change its controlling actions, or with a trigger of the change of the bus width mode in the bus width mode area 371.

Under the control of the instruction decode unit 320, as for a 16-bit add instruction, two pieces of 16-bit data are selected that are specified by certain addresses or register IDs in the data memory 340, according to an operand for the addition instruction and the like. The two pieces of 16-bit data selected will be placed on each set of 16-bit buses and inputted to the calculation unit 131 as srcA [15:0] and srcB [15:0] respectively. In like manner, as for a 12-bit add instruction, two pieces of 12-bit data in the data memory 340 are selected, and will be inputted to the calculation unit 131 as srcA [11:0] and srcB [11:0] respectively. In like manner, as for an 8-bit add instruction, two pieces of 8-bit data in the data memory 340 are selected, and will be inputted to the calculation unit 131 as srcA [7:0] and srcB [7:0] respectively.

In addition, under the control of the instruction decode unit 320, as for a 16-bit add instruction, a piece of 16-bit data, namely dest [15:0] outputted by the calculation unit 131 will be stored in an area specified by a certain address or a register ID in the data memory 140 according to an operand for the addition instruction and the like; as for a 12-bit add instruction, a piece of 12-bit data, namely dest [11:0] outputted by the calculation unit 131 will be stored in an area specified by a certain address or a register ID in the data memory 140 according to an operand for the addition instruction and the like; as for an 8-bit add instruction, a piece of 8-bit data, namely dest [7:0] outputted by the calculation unit 131 will be stored in an area specified by a certain address or a register ID in the data memory 140 according to an operand for the addition instruction and the like. A carry bit signal (carry) outputted by the calculation unit 131 will be stored in what is called a flag register or the like.

With the processor 300 arranged as above, it is possible to reduce electric power consumption in execution of application programs, depending on a number of bits required by each of the calculation instructions included therein, while maintaining the level of performance required for the execution of the application programs, even if a bus width mode is not specified within each of the application programs.

3. Third Embodiment

Figure 8:
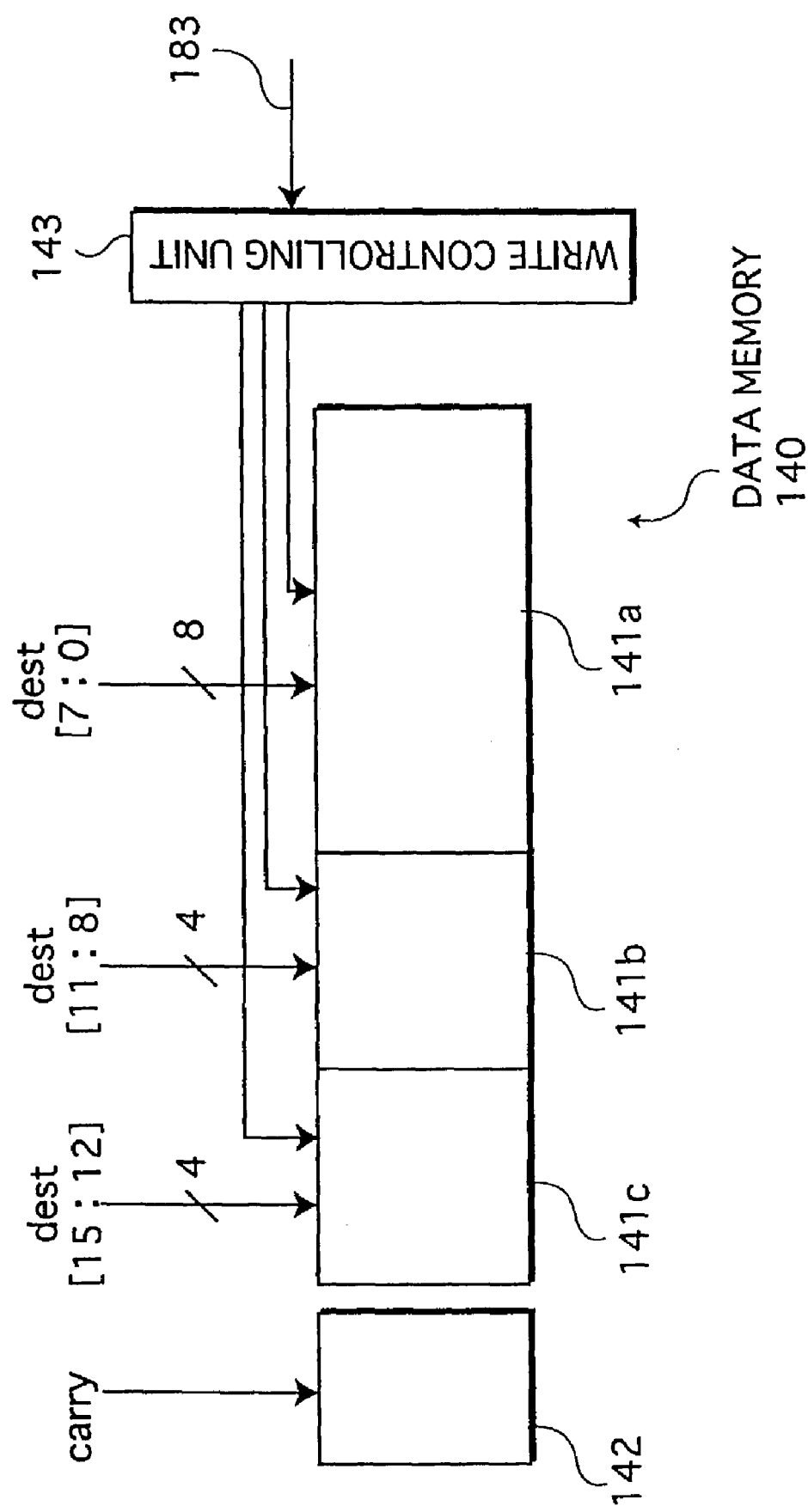
FIG. 8 is a diagram to show a part of the data memory 140 that is capable of performing write control in the third embodiment.

The following explains a modification in which a special write control is performed for writing into a part of the data memory 140 a piece of 16-bit data (dest [15:0]) and a carry bit signal (carry) both outputted by the calculation unit 131 in the processor 100 in the first embodiment, with reference to FIG. 8.

FIG. 8 is a diagram to show a part of the data memory 140 that is capable of performing write control in the third embodiment.

The data storing areas 141a, 141b, and 141c are an area for 8 bits, 4 bits, and 4 bits respectively, and these three data storing areas together make a 16-bit register. Each of the data storing areas is independent, and is arranged so that only when it receives a write signal, it will store in a storage element the data on the buses, which is a result outputted by the calculation unit 131.

The write controlling unit 143 is a circuit that performs control for having the data outputted by the calculation unit 131 written in a storage element, at a time when the calculation unit 131 completes calculation, under the control of the instruction decode unit 120. The write controlling unit 143 receives the signal 183 indicating a bus width mode transmitted by the bus width controlling unit 170, and provides some or all of the data storing areas with a write signal according to the bus width mode indicated. More specifically, the write controlling unit 143 (i) provides all of the data storing areas 141a, 141b, and 141c with a write signal if the 16-bit mode is selected, (ii) provides only the data storing areas 141a and 141b with a write signal if the 12-bit mode is selected, and (iii) provides only the data storing area 141a with a write signal if the 8-bit mode is selected.

As a result, when the 8-bit mode is selected, for instance, only dest [7:0] gets recorded in the data memory 140; therefore, electric power that would have been required for data-recording into the data storing areas 141b and 141c is not necessary. Thus, the electric power consumption in data-recording can be reduced compared to in the case where the 16-bit mode is selected.

4. Fourth Embodiment

The following explains a processor (hereafter referred to as "the modified processor") which comprises the calculation unit 231 instead, which is a modification of the calculation unit 131 in the processor 100 in the first embodiment, with reference to FIG. 9.

In this example, the bus width mode is either the 16-bit mode or the 8-bit mode, and the 8-bit mode means that a piece of 16-bit data is calculated by segments of 8 bits. It should be noted, however, that in this modified processor, it is arranged so that 16 bits of data will be effective in calculation whether the mode is the 16-bit mode or the 8-bit mode.

Other features of the modified processor that are not particularly discussed here are the same as in the processor 100 in the first embodiment.

FIG. 9 shows a detailed structure of the calculation unit 231 in the fourth embodiment.

As shown in the drawing, the calculation unit 231 is a circuit that performs calculation on two pieces of 16-bit data that are indicated as "srcA" and "srcB" in the drawing, and outputs a carry bit signal (carry) to indicate whether a carry has occurred or not, as well as a piece of 16-bit data indicated as "dest" in the drawing, as results of the calculation. The calculation unit 231 includes the input controlling unit 232, the calculators 233a and 233b, the carry transmitting unit 234, the carry controlling unit 235, the output controlling unit 236, and the clock gating controlling unit 237.

Here, the input controlling unit 232 is a selector that selects pieces of data to be inputted to the calculators from srcA [15:0] and srcB [15:0], according to the signal 183 indicating a bus width mode. In the 16-bit mode, the input controlling unit 232 (i) transmits srcA [7:0] and srcB [7:0] to two sets of 8-bit signal lines connected to the calculator 233a, as well as (ii) transmits srcA [15:8] and srcB [15:8] to two sets of 8-bit signal lines connected to the calculator 233b. In the 8-bit mode, the input controlling unit 232 (i) transmits srcA [7:0] and srcB [7:0] to two sets of 8-bit signal lines connected to the calculator 233a at the first clock timing, and (ii) transmits srcA [15:8] and srcB [15:8] again to the two sets of 8-bit signal lines connected to the calculator 233a at the second clock timing. It should be noted that the input controlling unit 232 receives the supply of clock signals so as to be able to input data into calculators prior to calculation, in synchronization with the calculation timing of the calculators.

Each of the calculators 233a and 233b is a circuit that (i) fetches two pieces of data on signal lines connected with the input controlling unit 232 upon a signal clock being supplied, (ii) adds up those two pieces of data while taking account of a carry bit signal inputted to the carry-in terminal, and (iii) outputs a piece of 8-bit data and a carry bit signal as results of the calculation. The carry transmitting unit 234 is a circuit that inputs a carry bit signal outputted by the calculator 233a selectively either to the carry-in terminal of the calculator 233a, the carry-in terminal of the calculator 233b, or the output controlling unit 236, under the control of the carry controlling unit 235.

The carry controlling unit 235 (i) controls the carry transmitting unit 234 to input a carry bit signal to the carry-in terminal of the calculator 233b when the 16-bit mode is selected, and (ii) controls the carry transmitting unit 234 to input a carry bit signal to the carry-in terminal of the calculator 233a at the first clock timing, and controls the carry transmitting unit 234 to input a carry bit signal to the output controlling unit 236 at the second clock timing, when the 8-bit mode is selected.

The output controlling unit 236 is a selector that outputs pieces of data outputted by the calculators to the outside of the calculation unit 231, i.e. to the data memory, according to the signal 183 indicating a bit width mode. In the 16-bit mode, the output controlling unit 236 (i) outputs a piece of 8-bit data outputted by the calculator 233a as dest [7:0], and outputs a piece of 8-bit data outputted by the calculator 233b as dest [15:8], and a carry bit signal outputted by the calculator 233b as "carry". In the 8-bit mode, the output controlling unit 236 receives two pieces of 8-bit data outputted by the calculator 233a respectively at the clock timing of the first addition and at the clock timing of the second addition, and outputs the first 8-bit data as dest [7:0], and the second 8-bit data as dest [15:8], and further outputs the carry bit signal transmitted by the carry transmitting unit 234 as "carry" at the following clock timing.

The clock gating controlling unit 237 is a circuit that transmits the clock signal (CLK) outputted from the frequency controlling unit 160 to both of the calculators 233a and 233b as "CLKA" and "CLKB" respectively when the 16-bit mode is selected, and transmits the clock signal only to the calculator 233a, and cuts off the supply of clock signals to the calculator 233b, when the 8-bit mode is selected.

In the modified processor as above, the time required for data calculation in the 8-bit mode is approximately twice as long as the time required for data calculation in the 16-bit mode; however, it is possible to reduce electric power consumption because of the calculator 233b not operating in the 8-bit mode.

Further, in the 8-bit mode, it is not necessary to transmit a carry bit signal between the calculators with one clock, but it is sufficient if a carry bit signal is transmitted with two clocks; therefore, it is possible to apply the control performed by the voltage controlling unit 150 and the frequency controlling unit 160 according to an operation mode, which was discussed in the section of the first embodiment. Consequently, when the 8-bit mode is combined with the low electric power consumption mode, the data calculation speed stays at approximately half of what it is in the 16-bit mode, and electric power consumption in data calculation is lower. When the 8-bit mode is combined with the high speed mode, the data calculation speed is higher than approximately half of what it is in the 16-bit mode.

5. Additional Explanation

The microprocessor of the present invention has been so far explained based on the first through fourth embodiments. Needless to say, the present invention is not limited to these embodiments. More specifically, the following should be noted:

(1) In the embodiments, the microprocessor was introduced as being constructed with a CMOS, but it is not necessarily limited to this.

(2) In the embodiments, the instructions to be decoded are the instructions fetched by the instruction memory from the external memory; however, it is also acceptable that the instructions to be decoded are the instructions directly in the external memory, or that the external memory includes some description for specifying one of the various instructions already stored in the instruction memory, and thus, the instruction specified by the description is to be decoded by the instruction decode unit 120. Further, it is acceptable if the external memory is an on-chip memory.

Also, the data memory presented in the embodiments could be a memory being outside of the microprocessor.

(3) In the embodiments, an example was shown in which a CHANGE instruction is used as a trigger of changing the control over the voltages impressed on the calculators and the frequencies of the clock signals to be supplied to the calculators; however, an instruction set does not have to include a dedicated instruction such as a CHANGE instruction so as to have an application program include a dedicated instruction. It is acceptable to arrange so that an application program stores in a specific register or a memory area with a specific address, a value indicating an operation mode or a bus width mode, and the voltage controlling unit, the frequency controlling unit, or the bus width controlling unit watches for changes in the contents of the specific register or the memory area with the specific address and takes it as a trigger for changing the control. In such a case, such specific register or the memory address with such specific address acts as the operation mode area or the bus width mode area presented in the embodiments earlier.

Further, it is also acceptable to arrange so that an operation mode and a bus width mode are recorded by the programmer etc. in the execution file of an application program, and consequently, an operating system reads those values indicating an operation mode and a bus width mode from the execution file when starting the application program, and copies those values in a specific register or a memory area with a specific address. Moreover, when the operating system executes different application programs at different times by occasionally switching them, it is acceptable to store the values indicating an operation mode and a bus width mode in correspondence with each of the application programs, so that when an application program is switched over to another, the values indicating an operation mode and a bus width mode for the new application program would be copied in a specific register etc. In addition, it is acceptable that the operating system stores in a memory area in advance, values indicating an operation mode and a bus width mode individually for each of the application programs, so that those specific registers are able to have settings according to the values stored, and it is also acceptable if an operator or the like is able to change the values stored. Furthermore, it is acceptable if a processor has a structure where it is possible to update the operation mode area and the bus width mode area via dedicated buses outside of the processor.

(4) It is acceptable to arrange so that execution is possible only in the supervisor mode as for a CHANGE instruction discussed in the embodiments, i.e. a dedicated instruction used for a trigger of changing the control over the voltage levels of the calculation unit and the frequencies of the clock signals supplied to the calculation unit, so that, for example, only such a CHANGE instruction issued in a nucleus program for an operating system that operates in the supervisor mode works as a trigger for changing the control over the voltage levels and the frequencies mentioned above.

(5) In the embodiments, the examples of voltage levels controlled by the voltage controlling unit were 1.8V, 1.6V, and 1.4V, and the examples of frequencies of clock signals controlled by the frequency controlling unit were 100 MHz, 133 MHz and 166 MHz; however, these are mere examples, and it is acceptable to find and use other appropriate values that enable normal performance by experiments in advance.

(6) In the embodiments, the voltage controlling unit and the frequency controlling unit perform the control according to the operation modes; however, it is also acceptable to arrange so that the control is effective only according to the bus width modes, and the operation mode is fixed to the normal mode, and thus, some of the components in the processor that are required only for the control according to the operation modes may be omitted. In such a case, the application programs do not need to include information or transfer instructions related to the operation modes. Further, when some of the components in the processor 300 in the second embodiment that are required only for the control according to the operation modes are omitted, the application programs to be executed by the processor 300 do not have to include CHANGE instructions, and information and transfer instructions related to the bus width modes.

(7) In the embodiments, the bus width modes discussed were the 8-bit mode, the 12-bit mode, and the 16-bit mode; however, it is also acceptable to have a 4-bit mode where calculation is performed using only a partial calculation circuit that is capable of performing data calculation on pieces of 4-bit data. It is also acceptable to have a 24-bit mode or a 32-bit mode by connecting different calculators so that the maximum number of bits to be calculated is 32 bits.

(8) In the embodiments, the voltage levels and the frequencies of the clock signals for adding circuits were discussed; however, it is possible to have the similar control over various data calculation circuits other than adding circuits, such as arithmetic circuits including a multiplying circuit, or logic circuits.

(9) In the embodiments, the clock gating controlling unit controls the supply of clock signals to the partial calculation units and calculators according to the bus width modes; however, it is also possible to control and cut off the supply of input data signals to the calculators according to the bus width modes instead of controlling the supply of clock signals. It is also acceptable to arrange the calculation unit so that electric power is individually supplied to each of the partial calculation units or calculators, and the supply of electric power to the partial calculation units and calculators can be cut off according to the bus width modes.

(10) In the first embodiment, the wiring connection is arranged so that the output voltage level of the calculators in the calculation unit becomes zero if no clock signals are supplied; however, it is also acceptable, instead of this arrangement, to arrange so that the most significant 4 bits or the most significant 8 bits of the 16-bit data as a result of data calculation of the whole calculation unit are an undefined value that has no reference value, and thus the application program does not refer to the value. Further, it is acceptable that the selecting circuit fills the 4 most significant bits of the resulting 16-bit data when the 12-bit mode is selected, or the 8 most significant bits of the resulting 16-bit data when the 8-bit mode is selected, with the same value as indicated in a selected carry bit signal (carry) that is either 0 or 1.

(11) In the third embodiment, as regards to writing into a data memory, the write controlling unit 143 provides some or all of the data storing areas with a write signal according to the bus width modes, and only such data storing areas that have been provided with a write signal will record certain data in the storing elements; however, it is also possible that the processor has a mechanism within itself that selectively controls the data-reading from the data storing areas according to the bus width modes, in addition to the control over data-writing. It should be noted that the effects of reducing electric power consumption are available, even if only the control over data-writing into, and data-reading from the data memory is performed according to the bus width modes, without the control over the supply of clock signals to the calculation unit according to bus width modes.

(12) In the fourth embodiment, the 16-bit mode where calculation of a piece of 16-bit data is performed with use of the calculators 233*a* and 233*b*, and the 8-bit mode where the same calculation is performed in two cycles with use of only the calculator 233*a*; however, it is also possible to have another mode available where calculation of one piece of 16-bit data is performed in two cycles with use of only the calculator 233*a*, and in parallel, calculation of the other piece of 16-bit data is performed in two cycles with use of only the calculator 233*b*. It is also possible to have yet another mode available where calculation on two pieces of 8-bit data is performed in parallel by the calculator 233*a* and the calculator 233*b* independently. When controlling different calculators in a calculation unit to perform calculation in parallel and independently, carry transmission between the calculators is not necessary; and since there is no such carry transmission, it is possible to control according to the high-speed mode or the low electric power consumption mode presented in the fourth and other embodiments.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A microprocessor that performs processing according to an instruction fetched from a memory, comprising:
   a calculation circuit that (i) includes partial calculation circuits which each perform partial data calculation, upon receiving a clock signal, and (ii) is operable to perform data calculation on N or less bits, where N is a total number of bits on which the partial calculation circuits are to perform data calculation,
   wherein the partial calculation circuits, except for a partial calculation circuit that performs data calculation on a most significant bit of the N bits, are each operable to output a carry bit signal indicating an overflow occurring during data calculation,
   the calculation circuit includes a carry bit signal transmitting unit that inputs to each of all the partial calculation circuits except for a partial calculation circuit that performs data calculation on a least significant bit of the N bits, a carry bit signal outputted from a partial calculation circuit that performs data calculation on a number of less significant bits than the particular partial calculation circuit to which such a carry bit signal is to be inputted does;
   a bit width selecting unit operable to select a bit width mode that designates a certain number of bits on which data calculation is to be performed;
   an execution controlling unit operable to, if the fetched instruction is an instruction for data calculation, control the calculation circuit to perform data calculation;
   an operation controlling unit operable to, when the execution controlling unit controls the calculation circuit to perform data calculation, (i) have all the partial calculation circuits operate, in a case where the bit width selecting unit selects a first bit width mode designating N bits, and (ii) suspend operation of a predetermined number of the partial calculation circuits, and have the rest of the partial circulation circuits operate, in a case where the bit width selecting unit selects a second bit width mode designating less than N bits; and
   a carry bit signal inhibiting unit operable to, in a case where the bit width selecting unit selects the second bit width mode, inhibit the carry bit signal transmitting unit from inputting a carry bit signal to the predetermined number of the partial calculation circuits to which the supply of a clock signal is suspended by the operation controlling unit, wherein
   the operation controlling unit (i) in a case where the bit width selecting unit selects the first bit width mode, supplies a clock signal to each of all the partial calculation circuits, and (ii) in a case where the bit width selecting unit selects the second bit width mode, suspends the supply of a clock signal to a predetermined number of the partial calculation circuits, and supplies a clock signal to each of the rest of the partial calculation circuits.

2. The microprocessor of claim 1, wherein:
   the partial calculation circuits each include a calculator and a bit data obtaining circuit, the calculator performing data calculation on a number of bits of data supplied, and the bit data obtaining circuit, upon receiving a clock signal, obtaining the number of bits of data from one or more data buses and supply to the calculator, the number being specific to each of the partial calculation circuits, and
   the operation controlling unit supplies a clock signal to each of the partial circulation circuits by supplying a clock signal to each of the bit data obtaining circuits.

3. The microprocessor of claim 1, further comprising:
   a clock frequency controlling unit operable to (i) control the operation controlling unit to supply the clock signal of a first frequency to each of the partial calculation circuits, in a case where the bit width selecting unit selects the first bit width mode, and (ii) control the operation controlling unit to supply the clock signal of a second frequency, which is higher than the first frequency, to each of the partial calculation circuits, in a case where the bit width selecting unit selects the second bit width mode.

4. The microprocessor of claim 1, further comprising: a voltage controlling unit operable to control a voltage level so as to (i) impress a voltage of a first voltage level on the calculation circuit in a case where the bit width selecting unit selects the first bit width mode, and (ii) impress a voltage of a second voltage level, which is lower than the first voltage level, on the calculation circuit in a case where the bit width selecting unit selects the second bit width mode.

5. The microprocessor of claim 1, further comprising:
a clock frequency controlling unit operable to (i) control the operation controlling unit to supply the clock signal of a first frequency to each of the partial calculation circuits, in a case where the bit width selecting unit selects the first bit width mode, and (ii) control the operation controlling unit to supply the clock signal of a second frequency, which is higher than the first frequency, to each of the partial calculation circuits, in a case where the bit width selecting unit selects the second bit width mode;
a voltage controlling unit operable to control a voltage level so as to (i) impress a voltage of a first voltage level on the calculation circuit in a case where the bit width selecting unit selects the first bit width mode, and (ii) impress a voltage of a second voltage level, which is lower than the first voltage level, on the calculation circuit in a case where the bit width selecting unit selects the second bit width mode;
a control mode selecting unit operable to select a control mode in terms of the frequency of the clock signal to be supplied to each of the partial calculation circuits, and the voltage level of the voltage to be impressed on the calculation circuit; and
a switching unit operable to (i) in a case where the control mode selecting unit selects a first control mode, enable the clock frequency controlling unit to control, and disable the voltage controlling unit to control, and (ii) in a case where the control mode selecting unit selects a second control mode, enable the voltage controlling unit to control, and disable the frequency controlling unit to control.

6. The microprocessor of claim 5, further comprising:
a signal stabilizing unit operable to maintain at a predetermined level, for a predetermined period of time, a voltage level of a signal line used for outputting a signal to outside of the microprocessor, the predetermined period starting from when the control mode selecting unit changes from one control mode to another control mode.

7. The microprocessor of claim 1, comprising:
a memory access unit operable to access an external memory, wherein
if the fetched instruction is an instruction for data-writing into a memory, the execution controlling unit has the memory access unit write one or more pieces of data into the external memory, and
the bit width selecting unit selects a bit width mode according to a value stored in a predetermined area of the external memory.

8. The microprocessor of claim 1, wherein:
if the fetched instruction is an instruction for data calculation, the bit width selecting unit selects (i) the first bit width mode, in a case where the fetched instruction is an instruction for data calculation on N bits, and (ii) the second bit width mode, in a case where the fetched instruction is an instruction for data calculation on less than N bits.

9. The microprocessor of claim 1, comprising:
a data storage unit including an area that stores therein a result of data calculation performed by the calculation circuit, the result being N bits; and
a data writing controlling unit operable to (i) in a case where the first bit width mode is selected, have the entire N bits of the result written in the area and (ii) in a case where the second bit width mode is selected, have only a part of the result being less than N bits written in the area.

10. The microprocessor of claim 1, comprising:
a data writing controlling unit operable to (i) in a case where the first bit width mode is selected, have the entire N bits of a result outputted from the calculation circuit written in an external memory, and (ii) in a case where the second bit width mode is selected, have only a part of the result being less than N bits written in the external memory.

11. The microprocessor of claim 1, wherein:
the calculation circuit includes two partial calculation circuits that each perform partial data calculation on N/2 bits, and
the execution controlling unit, if the fetched instruction is an instruction for data calculation on N bits, and also in a case where the bit width selecting unit selects the second bit width mode, (i) have one of the partial calculation circuits perform partial data calculation on lower N/2 bits out of the N bits, before (ii) having the same partial calculation circuit perform partial data calculation on upper N/2 bits, while taking account of an overflow, if any, that has occurred during the partial data calculation on the lower N/2 bits.

12. The microprocessor of claim 1, wherein:
the partial calculation circuits each perform partial data calculation upon receiving a number of bits of data supplied, and
the operation controlling unit (i) supplies to each of the partial calculation circuits as many number of bits of as possible for that particular partial calculation circuit, in a case where the bit width mode selecting unit selects the first bit width mode, and (ii) suspends the supply of bits of data to a predetermined number of the partial calculation circuits, and supplies to each of the rest of the partial calculation circuits, as many number of bits as possible for that particular partial calculation circuit, in a case where the bit width mode selecting unit selects the second bit width mode.

13. The microprocessor of claim 1, wherein:
each of the partial calculation circuits performs data calculation while a predetermined level of a voltage is being impressed thereon, and the operation controlling unit (i) impresses the predetermined level of the voltage on each of all the partial calculation circuits, in a case where the bit width selecting unit selects the first bit width mode, and (ii) suspends the impression of the predetermined level of the voltage on a predetermined number of the partial calculation circuits, and impresses the predetermined level of the voltage on each of the rest of the partial calculation circuits, in a case where the bit width selecting unit selects the second bit width mode.

14. The microprocessor of claim 13, comprising:
a memory access unit operable to access an external memory, wherein
if the fetched instruction is an instruction for data-writing into a memory, the execution controlling unit has the memory access unit write one or more pieces of data into the external memory, and
the bit width selecting unit selects a bit width mode according to a value stored in a predetermined area of the external memory.

15. The microprocessor of claim 13, wherein:
if the fetched instruction is an instruction for data calculation, the bit width selecting unit selects (i) the first bit width mode, in a case where the fetched instruction is an instruction for data calculation on N bits, and (ii) the second bit width mode, in a case where the fetched instruction is an instruction for data calculation on less than N bits.

16. A microprocessor that performs processing according to an instruction fetched from a memory, comprising:
a calculation circuit that (i) includes partial calculation circuits which each perform partial data calculation, and (ii) is operable to perform data calculation on N or less bits, where N is a total number of bits on which the partial calculation circuits are to perform data calculation, wherein the calculation circuit performs data calculation upon receiving a clock signal;
a frequency changing unit operable to change a frequency of the clock signal to be supplied to the calculation circuit;
a signal stabilizing unit operable to maintain at a predetermined level, for a predetermined period of time, a voltage level of a signal line used for outputting a signal to outside of the microprocessor, the predetermined period starting from when the frequency changing unit changes the frequency;
a bit width selecting unit operable to select a bit width mode that designates a certain number of bits on which data calculation is to be performed;
an execution controlling unit operable to, if the fetched instruction is an instruction for data calculation, control the calculation circuit to perform data calculation; and
an operation controlling unit operable to, when the execution controlling unit controls the calculation circuit to perform data calculation, (i) have all the partial calculation circuits operate, in a case where the bit width selecting unit selects a first bit width mode designating N bits, and (ii) suspend operation of a predetermined number of the partial calculation circuits, and have the rest of the partial circulation circuits operate, in a case where the bit width selecting unit selects a second bit width mode designating less than N bits.

17. A microprocessor that performs processing according to an instruction fetched from a memory, comprising:
a calculation circuit that (i) includes partial calculation circuits which each perform partial data calculation, and (ii) is operable to perform data calculation on N or less bits, where N is a total number of bits on which the partial calculation circuits are to perform data calculation, wherein the calculation circuit performs data calculation while a predetermined level of a voltage is being impressed thereon;
a voltage changing unit operable to change a voltage level to be impressed on the calculation circuit within a predetermined range;
a signal stabilizing unit operable to maintain at a predetermined level, for a predetermined period of time, a voltage level of a signal line used for outputting a signal to outside of the microprocessor, the predetermined period starting when the voltage changing unit changes the voltage level;
a bit width selecting unit operable to select a bit width mode that designates a certain number of bits on which data calculation is to be performed;
an execution controlling unit operable to, if the fetched instruction is an instruction for data calculation, control the calculation circuit to perform data calculation; and
an operation controlling unit operable to, when the execution controlling unit controls the calculation circuit to perform data calculation, (i) have all the partial calculation circuits operate, in a case where the bit width selecting unit selects a first bit width mode designating N bits, and (ii) suspend operation of a predetermined number of the partial calculation circuits, and have the rest of the partial circulation circuits operate, in a case where the bit width selecting unit selects a second bit width mode designating less than N bits.

18. In a microprocessor having a capacity of conserving power and increasing processing speed, the improvement comprising:
a data calculation unit including a plurality of partial calculation circuits that can be enabled to perform a calculation process by employing all or less than all of the plurality of partial calculation circuits;
a control mode selecting unit for selecting a clock signal frequency from a plurality of frequency levels and a voltage level from a plurality of voltage levels to be applied to those partial calculation circuits enabled to perform the calculation process, wherein an enablement of less than all of the partial calculation circuits saves power consumption at a lower voltage level and/or increases calculation process speed at a higher clock frequency level;
a switching unit responsive to the control mode selecting unit to enable a clock frequency control unit to control the plurality of partial calculation circuits in a first control mode and to enable a voltage controlling unit to control the plurality of partial calculation circuits in a second control mode; and
a signal stabilizing unit operable to maintain at a predetermined level, for a predetermined period of time, a voltage level of a signal line used for outputting a signal to outside of the microprocessor, the predetermined period starting from when the control mode selecting unit changes from one control mode to another control mode.

19. The microprocessor of claim 18, further including:
a memory access unit operable for accessing an external memory, wherein the control mode selecting unit is enabled by a fetched instruction to operatively enable less than all of the plurality of partial calculation circuits.

20. In a microprocessor having a capacity of conserving power and increasing processing speed, the improvement comprising:
a data calculation unit including a plurality of partial calculation circuits that can be enabled to perform a calculation process by employing all or less than all of the plurality of partial calculation circuits;
a control mode selecting unit for selecting a clock signal frequency from a plurality of frequency levels and a voltage level from a plurality of voltage levels to be applied to those partial calculation circuits enabled to perform the calculation process, including a bit width selecting unit that changes a bit width mode depending on a number of bits in data to be calculated in a fetched calculation instruction, wherein the control mode selecting unit is enabled by the fetched instruction to operatively enable less than all of the plurality of partial calculation circuits;

a switching unit responsive to the control mode selecting unit to enable a clock frequency control unit to control the plurality of partial calculation circuits in a first control mode and to enable a voltage controlling unit to control the plurality of partial calculation circuits in a second control mode; and a memory access unit operable for accessing an external memory to receive data, wherein an enablement of less than all of the partial calculation circuits saves power consumption at a lower voltage level and/or increases calculation process speed at a higher clock frequency level.

21. The microprocessor of claim 20, further comprising:
a signal stabilizing unit operable to maintain at a predetermined level, for a predetermined period of time, a voltage level of a signal line used for outputting a signal to outside of the microprocessor, the predetermined period starting from when the control mode selecting unit changes from one control mode to another control mode.

22. In a microprocessor having a capacity of conserving power and increasing processing speed, the improvement comprising:

a data calculation unit including a plurality of partial calculation circuits that can be enabled to perform a calculation process by employing all or less than all of the plurality of partial calculation circuits;

a memory access unit operable for accessing an external memory;

a control mode selecting unit for selecting a clock signal frequency from a plurality of frequency levels and a voltage level from a plurality of voltage levels to be applied to those partial calculation circuits enabled to perform the calculation process, including a bit width selecting unit for selecting a bit width mode representative of the number of partial calculation circuits to be enabled for a particular calculation process from a value stored in a predetermined area of the external memory, wherein the control mode selecting unit is enabled by a fetched instruction to operatively enable less than all of the plurality of partial calculation circuits; and a switching unit responsive to the control mode selecting unit to enable a clock frequency control unit to control the plurality of partial calculation circuits in a first control mode and to enable a voltage controlling unit to control the plurality of partial calculation circuits in a second control mode;

wherein an enablement of less than all of the partial calculation circuits saves power consumption at a lower voltage level and/or increases calculation process speed at a higher clock level frequency level.

23. The microprocessor of claim 22, wherein:
the bit width selecting unit selects a first bit width mode when the fetched instruction is an instruction for data calculation of N bits and a second bit width mode when the fetched instruction is an instruction for data calculation on less than N bits.

24. The microprocessor of claim 22, further comprising:
a signal stabilizing unit operable to maintain at a predetermined level, for a predetermined period of time, a voltage level of a signal line used for outputting a signal to outside of the microprocessor, the predetermined period starting from when the control mode selecting unit changes from one control mode to another control mode.

* * * * *